US006609118B1

(12) United States Patent
Khedkar et al.

(10) Patent No.: US 6,609,118 B1
(45) Date of Patent: Aug. 19, 2003

(54) METHODS AND SYSTEMS FOR AUTOMATED PROPERTY VALUATION

(75) Inventors: Pratap Shankar Khedkar, Philadelphia, PA (US); Piero Patrone Bonissone, Schenectady, NY (US); David Clarence Golibersuch, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/337,284

(22) Filed: Jun. 21, 1999

(51) Int. Cl.⁷ .............................................. G06F 17/00
(52) U.S. Cl. ...................... 705/400; 705/10; 705/30; 705/35; 705/36; 705/37; 705/38; 705/26; 705/27; 707/10; 707/100; 707/200
(58) Field of Search .......................... 705/400, 10, 30, 705/35, 36, 37, 38, 26, 27; 707/200, 100, 10

(56) References Cited

U.S. PATENT DOCUMENTS

| 5,361,201 A | * | 11/1994 | Jost et al. ................... 364/401 |
| 5,857,174 A | * | 1/1999 | Dugan ............................ 705/1 |
| 6,178,406 B1 | * | 1/2001 | Cheetham et al. ............ 705/10 |

FOREIGN PATENT DOCUMENTS

| WO | 20002/0035520 A1 | * | 3/2002 | .......... G06F/17/60 |

OTHER PUBLICATIONS

Valentine, Automated Valuation Models Speed the Appraisal Process. [retrieved on Apr. 9, 2002]. Retrieved from the Internet:<URL: http//www.banking.com/aba/mortgage_0199.asp>.

O'Rourke, Automated Valuation Models—threat and opportunity. Appraisal today [online], Sep. 1998 [retrieved on Apr. 9, 2002 ]. Retrieved from the Internet:<URL: http//www.appraisaltoday.com/avms.htm>.

O'Rourke, Where Have We Been and Where Are We Going? O'Rourke's predictions for 1999. Appraisal Today [online], Jan. 1999 [retrieved on Apr. 9, 2002]. Retrieved from the Internet:<URL: http://www.appraisaltoday.com/sample1.htm>.

Case Shiller Weiss, [retrieved on Apr. 9, 2002] Retrieved from the Internet: <URL: http://www.cswcasa.com/>.

Automated valuation models spped the appraisal process (Http://www.banking.com/aba/mortgate).*

Automated valuation models—threat and Opportunity (Appraisal Today, Oct. 1999).*

* cited by examiner

Primary Examiner—James P. Trammell
Assistant Examiner—C Owen Sherr
(74) Attorney, Agent, or Firm—Christoper L. Bernard, PLLC

(57) ABSTRACT

The present invention is a method and system for automating the process for valuing a property that produces an estimated value of a subject property, and a quality assessment of the estimated value, that is based on the fusion of multiple processes for valuing a property. In one embodiment, three processes for valuing a subject property are fused. The first process, called LOCVAL, uses the location and living area to provide an estimate of the subject property's value. The second process, called AIGEN, is a generative artificial intelligence method that trains a fuzzy-neural network using a subset of cases from a case-base, and produces a run-time system to provide an estimate of the subject property's value. The third process, called AICOMP, uses a case based reasoning process similar to the sales comparison approach to determine an estimate of the subject property's value.

26 Claims, 18 Drawing Sheets

FIG. 7

| Comparable's # Bedrooms | | 1 | 2 | 3 | 4 | 5 | 6+ |
|---|---|---|---|---|---|---|---|
| Subject's # Bedrooms | 1 | 1.00 | 0.50 | 0.05 | 0.00 | 0.00 | 0.00 |
| | 2 | 0.20 | 1.00 | 0.50 | 0.05 | 0.00 | 0.00 |
| | 3 | 0.05 | 0.30 | 1.00 | 0.60 | 0.05 | 0.00 |
| | 4 | 0.00 | 0.05 | 0.50 | 1.00 | 0.60 | 0.20 |
| | 5 | 0.00 | 0.00 | 0.05 | 0.60 | 1.00 | 0.80 |
| | 6+ | 0.00 | 0.00 | 0.00 | 0.20 | 0.80 | 1.00 |

FIG. 8

| Subject | Comparable | | | | | | | | |
|---|---|---|---|---|---|---|---|---|---|
| | | 1 | 1.5 | 2 | 2.5 | 3 | 3.5 | 4 | 4.5 | 5+ |
| 1 | | 1.00 | 0.75 | 0.20 | 0.05 | 0.01 | 0.00 | 0.00 | 0.00 | 0.00 |
| 1.5 | | 0.60 | 1.00 | 0.60 | 0.25 | 0.10 | 0.05 | 0.00 | 0.00 | 0.00 |
| 2 | | 0.10 | 0.70 | 1.00 | 0.70 | 0.25 | 0.05 | 0.00 | 0.00 | 0.00 |
| 2.5 | | 0.05 | 0.20 | 0.75 | 1.00 | 0.75 | 0.20 | 0.05 | 0.00 | 0.00 |
| 3 | | 0.01 | 0.10 | 0.40 | 0.80 | 1.00 | 0.80 | 0.40 | 0.10 | 0.00 |
| 3.5 | | 0.00 | 0.05 | 0.15 | 0.45 | 0.85 | 1.00 | 0.85 | 0.45 | 0.05 |
| 4 | | 0.00 | 0.00 | 0.05 | 0.20 | 0.50 | 0.90 | 1.00 | 0.90 | 0.30 |
| 4.5 | | 0.00 | 0.00 | 0.00 | 0.10 | 0.30 | 0.70 | 0.95 | 1.00 | 0.70 |
| 5+ | | 0.00 | 0.00 | 0.00 | 0.05 | 0.15 | 0.35 | 0.75 | 0.95 | 1.00 |

FIG. 9

| Attribute | Subject | Comparable | Comparison | Preference | Weight | Weighted Preference |
|---|---|---|---|---|---|---|
| Months since date of sale | X | 6 months | 6 months | 0.67 | 0.222 | 0.1489 |
| Distance | X | 0.2 miles | 0.2 miles | 1.00 | 0.222 | 0.2222 |
| Living Area | 2000 | 1800 | 90% | 0.79 | 0.333 | 0.2633 |
| Lot Size | 20000 | 35000 | 175% | 0.33 | 0.111 | 0.0367 |
| # Bedroom | 3 | 3 | 0% | 1.00 | 0.056 | 0.0556 |
| # Bathrooms | 2.5 | 2 | 2.5->2 | 0.75 | 0.056 | 0.0417 |
| Similarity Measure (Sum of Weighted Preference/Sum of Weights) = | | | | | | 0.768333 |

| | |
|---|---|
| Living Area | (subject - comp) * (22 + (Sales_Price_of_comp * .00003) |
| Lot Area | (subject - comp) * 1 |
| Bathrooms | see figure 11 |
| Fireplaces | (subject - comp) * 2000 |
| Effective Year Built | w * (Age_comp-Age_subject) * (Sale_Price_comp/1000) |
| | if(Age_subject + Age_comp)/2<4 then w = 4 else |
| | if(Age_subject + Age_comp)/2<6 then w = 3 else |
| | if(Age_subject + Age_comp)/2<8 then w = 2 else |
| | if(Age_subject + Age_comp)/2<15 then w = 1 else |
| | w = .5 |
| | max of 10% of sale price |
| Quality | (.02 * sale price) for each level of difference: (Luxury>Excellent>Good>Average>Fair>Poor) |
| Pool | $ 10000 for a pool |

FIG. 11

| Subject | Comp | 1.5 | 2 | 2.5 | 3 | 3.5 | 4 | 4.5 | 5+ |
|---|---|---|---|---|---|---|---|---|---|
| | 1 | | | | | | | | |
| 1 | 0.00 | -1.50 | -3.00 | -5.00 | -8.00 | N/A | N/A | N/A | N/A |
| 1.5 | 1.00 | 0.00 | -1.00 | -3.50 | -6.00 | -9.00 | N/A | N/A | N/A |
| 2 | 4.00 | 1.50 | 0.00 | -2.25 | -4.00 | -6.50 | N/A | N/A | N/A |
| 2.5 | 7.00 | 4.50 | 2.00 | 0.00 | -2.00 | -4.50 | -7.00 | N/A | N/A |
| 3 | 9.00 | 6.50 | 3.00 | 2.00 | 0.00 | -2.50 | -5.00 | -7.50 | '@*-5 |
| 3.5 | N/A | 8.50 | 6.50 | 4.50 | 2.50 | 0.00 | -3.00 | -5.50 | '@*-5 |
| 4 | N/A | N/A | 8.50 | 7.00 | 5.50 | 3.00 | 0.00 | -3.00 | '@*-5 |
| 4.5 | N/A | N/A | N/A | 10.00 | 8.00 | 6.00 | 3.00 | 0.00 | '@*-5 |
| 5+ | N/A | N/A | N/A | '@*5 | '@*5 | '@*5 | '@*5 | '@*5 | 0.00 |

FIG. 12

| Attribute | Subject | Comparable | Adjustment |
|---|---|---|---|
| Sale Price | ? | 175000 | 175000 |
| Living Area | 2000 | 1800 | 5450 |
| Lot Area | 20000 | 25000 | -5000 |
| SFR Total Baths | 2.5 | 2 | 2000 |
| SFR Bedrooms | 3 | 3 | |
| SFR Fireplaces | 1 | 0 | 2000 |
| Eff Year Built | 93 | 89 | 2800 |
| Quality | Good | Average | 3500 |
| Condition | Average | Average | |
| Pool | Yes | No | 10000 |
| Adjusted Price = | | | 195750 |

FIG. 14

| Comparable | Score Value | Score Rank | Net Adjust Value | N.A. Rank | Gross Adjust Value | G.A. Rank | Total Rank |
|---|---|---|---|---|---|---|---|
| 113-012 | 0.95 | 1 | 1344 | 2 | 5924 | 4 | 7 |
| 306-018 | 0.88 | 2 | 3586 | 5 | 4186 | 1 | 8 |
| 093-011 | 0.78 | 3 | 5686 | 7 | 8191 | 7 | 17 |
| 305-006 | 0.67 | 4 | 6150 | 8 | 6160 | 6 | 18 |
| 685-046 | 0.64 | 5 | 3139 | 3 | 6099 | 5 | 13 |
| 847-984 | 0.58 | 6 | -948 | 1 | 5670 | 3 | 10 |
| 873-005 | 0.53 | 7 | -5261 | 6 | 9261 | 8 | 21 |
| 431-023 | 0.48 | 8 | 3546 | 4 | 4410 | 2 | 14 |
| 331-018 | 0.44 | 9 | 9310 | 9 | 11300 | 9 | 27 |

| Comparable | Adjusted Price | Score | Weighted Price |
|---|---|---|---|
| 113-012 | 197000 | 0.95 | 187150 |
| 306-008 | 202000 | 0.88 | 177760 |
| 093-011 | 196500 | 0.78 | 153270 |
| 685-046 | 192000 | 0.64 | 122880 |
| 847-984 | 201000 | 0.58 | 116580 |
| Total | | 3.83 | 757640 |

Final estimate = 757640/3.83 = 199900

FIG. 17

| Error | Comps Found | Simil. | Atyp. | Comps Dev. | Comps Span | Conf. Value |
|---|---|---|---|---|---|---|
| -9.8 | 3 | 0.63 | 1.42 | 2.02 | 6.32 | 0.15 |
| -2 | 35 | 0.94 | 0.38 | 2.24 | 8.57 | 1.00 |
| 17.3 | 11 | 0.71 | 0.94 | 5.67 | 19 | 0.70 |
| 0.5 | 24 | 0.85 | 0.66 | 2.05 | 7.24 | 1.00 |
| -1.6 | 14 | 0.95 | 0.29 | 2.89 | 9.33 | 1.00 |
| 5.2 | 15 | 0.90 | 0.73 | 3.24 | 12 | 1.00 |
| 5.2 | 12 | 0.74 | 0.17 | 4.5 | 18 | 0.80 |
| 3.1 | 19 | 0.74 | 0.81 | 2.83 | 8.11 | 0.80 |
| -13.9 | 12 | 0.82 | 1.97 | 3.85 | 15 | 0.00 |
| 7.8 | 11 | 0.77 | 1.34 | 4.24 | 13 | 0.32 |

US 6,609,118 B1

METHODS AND SYSTEMS FOR AUTOMATED PROPERTY VALUATION

BACKGROUND OF THE INVENTION

The present invention relates generally to property valuation and more particularly to automated property valuation.

Property valuation is a process of determining a dollar estimate of a property's value for given market conditions. The value of a property changes with market conditions. Consequently, a property's value is often updated to reflect changes in market conditions, including for example, recent real estate transactions.

Property valuations have many applications. For example, many financial institutions grant new mortgages to homebuyers, and purchase mortgage packages, which can contain hundreds of mortgages, on the secondary market as investments. Property valuations are usually necessary to grant most new mortgages, as well as to evaluate mortgage packages that may be available for purchase. By way of further example, property valuations are also used to guide buyers and sellers with making purchasing decisions, and are needed for a variety of insurance purposes.

The current process for valuing properties usually requires an on-site visit by a human appraiser, can take several days, and can cost hundreds of dollars per subject property. The process usually used by appraisers is a sales comparison approach, which consists of finding comparables (i.e., recent sales that are comparable to the subject property, using for example sales records), contrasting the subject property with the comparables, adjusting the comparables' sales prices to reflect the differences thereof from the subject property, using for example, heuristics and personal experience, and reconciling the comparables' adjusted sales prices to derive an estimate for the subject property, using any reasonable averaging method.

The human appraisal process is slow and expensive for multiple appraisals, which are often required by banks to, for example, update their loan and insurance portfolios, verify risk profiles of servicing rights, or evaluate default risks for securitized mortgage packages. Consequently, the appraisal process for multiple valuations is currently estimated, to a lesser degree of accuracy, by sampling techniques.

SUMMARY OF THE INVENTION

Thus, there is a particular need to automate the valuation process. The present invention is a method and system for automating the valuation process that produces an estimated value of a subject property that is based on the fusion of multiple processes for valuing property. In one embodiment, three processes for valuing a subject property are fused. The first process, called LOCVAL, uses the location and living area to provide an estimate of the subject property's value. The second process, called AIGEN, is a generative artificial intelligence method that trains a fuzzy-neural network using a subset of cases from a case-base, and produces a run-time system to provide an estimate of the subject property's value. The third process, called AICOMP, uses a case based reasoning process similar to the sales comparison approach to determine an estimate of the subject property's value.

The fusion of LOCVAL, AIGEN and AICOMP provides a better estimate than any one method alone. Fusion also provides a way of assessing the quality or reliability of the fused estimate. If reliability is high, the fused estimate is more accurate than any of the individual estimates. If reliability is limited, an explanation is provided as to the limitations of the estimate. These characteristics allow for a determination of the suitability of the estimate within a given business application context.

BRIEF DESCRIPTION OF THE DRAWINGS

FIG. 7 shows the reflexive asymmetric relations for the bedrooms attribute.

FIG. 8 shows the reflexive asymmetric relations for the bathrooms attribute.

FIG. 9 shows an example of the similarity measure computation.

FIG. 10 illustrates sample adjustment rules.

FIG. 11 shows an example of adjustments to a comparable's prices as a function of the number of different bathrooms between the subject property and the comparable property.

FIG. 12 shows a sample computation of a comparable's adjusted price.

FIG. 14 shows a comparison of comparables based on a number of different factors.

FIG. 15 shows a sample computation of the final estimate.

FIG. 17 illustrates that the estimated error decreases as the number of comparables increases.

DETAILED DESCRIPTION OF THE INVENTION

An automated property valuation for a subject property is obtained by combining the outputs of the three property valuation estimators, which are referred to as LOCVAL, AIGEN, and AICOMP. These three estimators, which are described below, each provide an independent estimate of a value for a subject property using different methodologies.

LOCVAL

Figure 1:
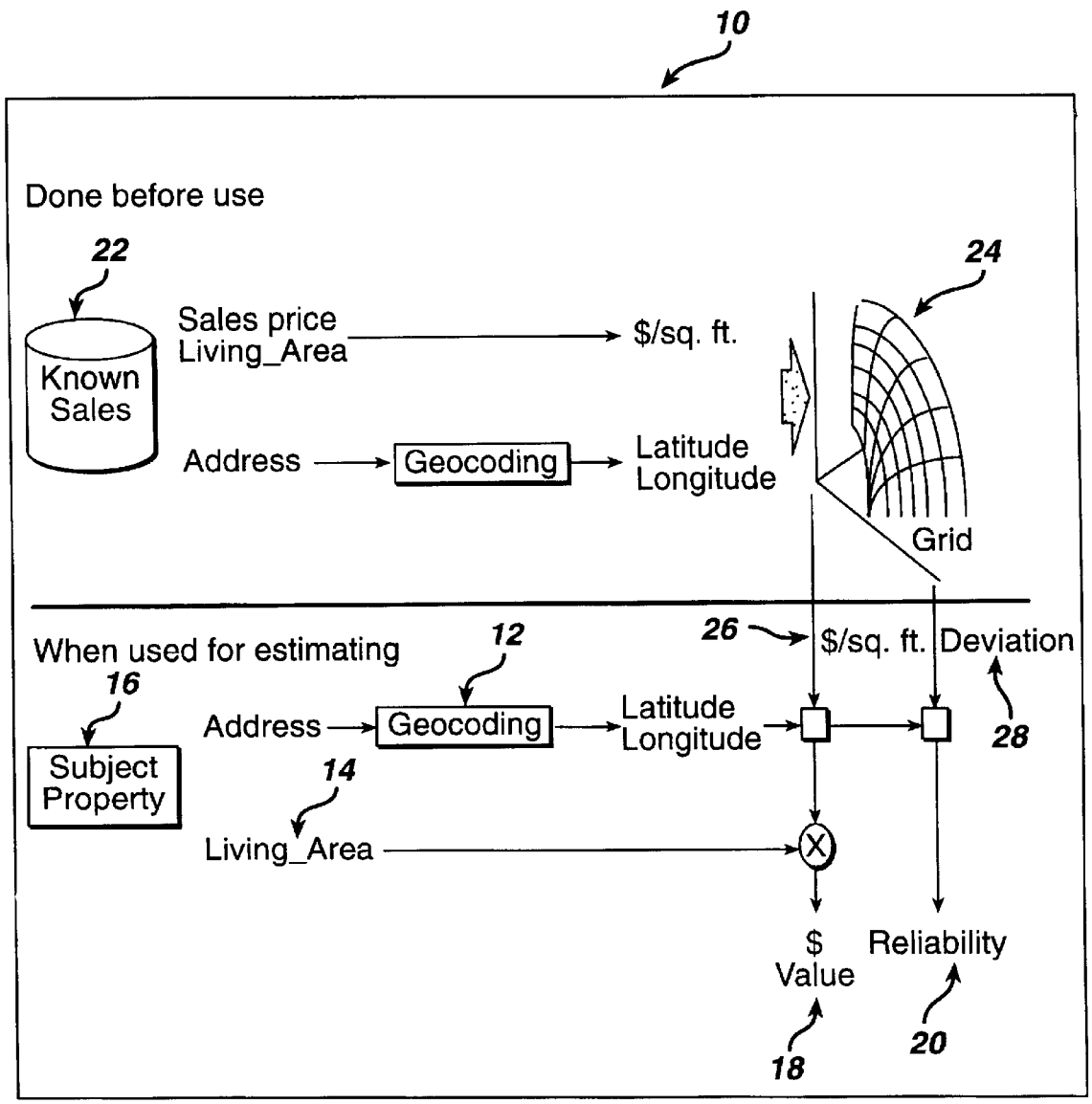
FIG. 1 shows a schematic of the LOCVAL system.

Referring to FIG. 1, the LOCVAL system 10, which can be implemented in the form of a computer program, takes as an input a valid, geocoded address 12 and a living area 14 (in sq. ft.) for the subject property 16, and outputs two values, the locational_value 18, which is an estimated value of the subject property, and deviation$_{13\ 1\ from}$—prevailing 20, which is the standard deviation for properties within the selected geographic region. If either input is missing, or clearly out-of-range, LOCVAL 10 does not provide an output.

The output is based the values of all properties within a certain geographic region, for example a neighborhood, city, county or state. In this regard, all known, filtered historical sales 22 in a geographic region are used to construct a smooth surface 24 spanning a geographic region that represents a dollar/sq. ft. value 26 and deviation 28 at every point of longitude and latitude within the selected geographic region. A smoothing function 24 is derived using radial basis functions that drop off exponentially with distance and a "space" constant of about 0.15–0.2 miles. The smoothing function 24 is described as the weighted sum of radial basis functions (all of the same width), each situated at the site of a sale within the past one year and having an amplitude equal to the sales price. Consequently, based on the inputs of a valid, geocoded address 12 and a living area 14 for the subject property 16, an estimate 18 of the subject property's value and corresponding reliability 20 can be obtained.

AIGEN

Figure 2:
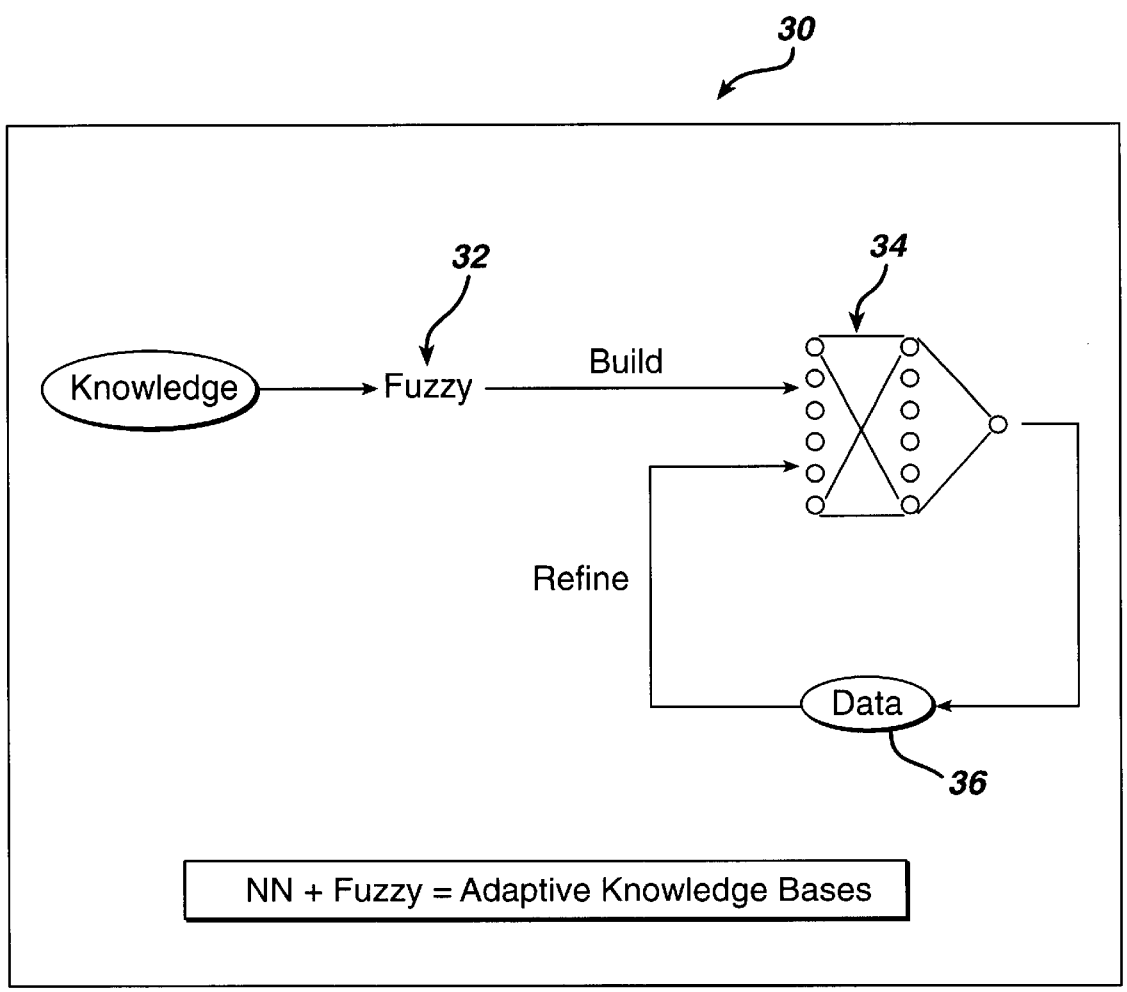
FIG. 2 shows a schematic of the AIGEN system.

Referencing FIG. 2, the AIGEN system 30 is a generative system based on a combination of fuzzy logic systems 32 and neural networks 34. The AIGEN system 30 is a network-based implementation of fuzzy inference based on a system that implements a fuzzy system as a five-layer neural network 34 so that the structure of the network 34 can be interpreted in terms of high-level rules. The neural network 34 is trained automatically from data 36.

Figure 3:
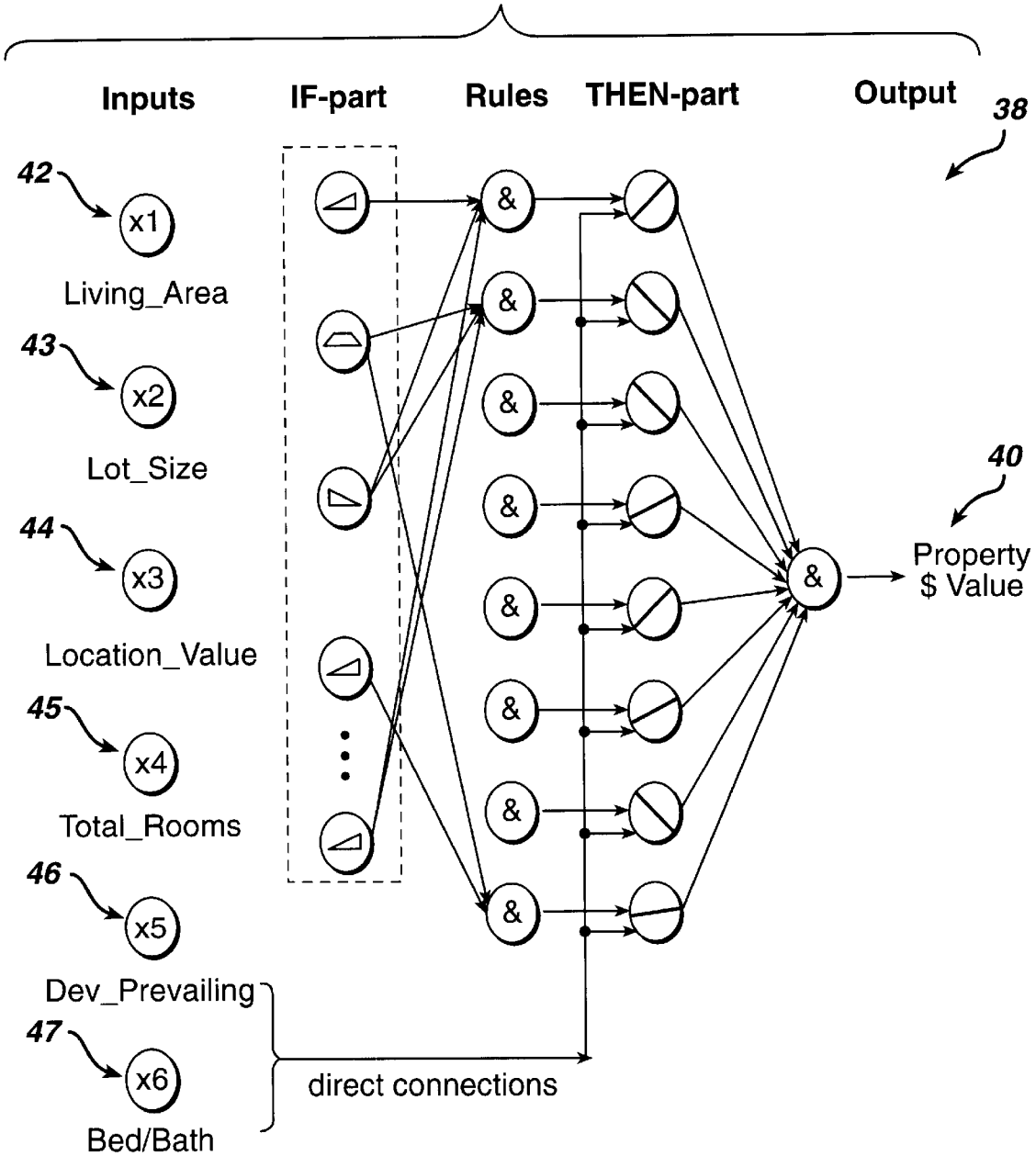
FIG. 3 shows a schematic of the architecture of the AIGEN system.

FIG. 3 shows the architecture 38 used to output an estimate of the subject property's value 40. The output may comprise linear functions of variables that do not necessarily occur in the input (i.e., segment the input space on a proper subset of the total variable set only and use a cylindrical projection of that segmentation for the whole space).

Figure 4:
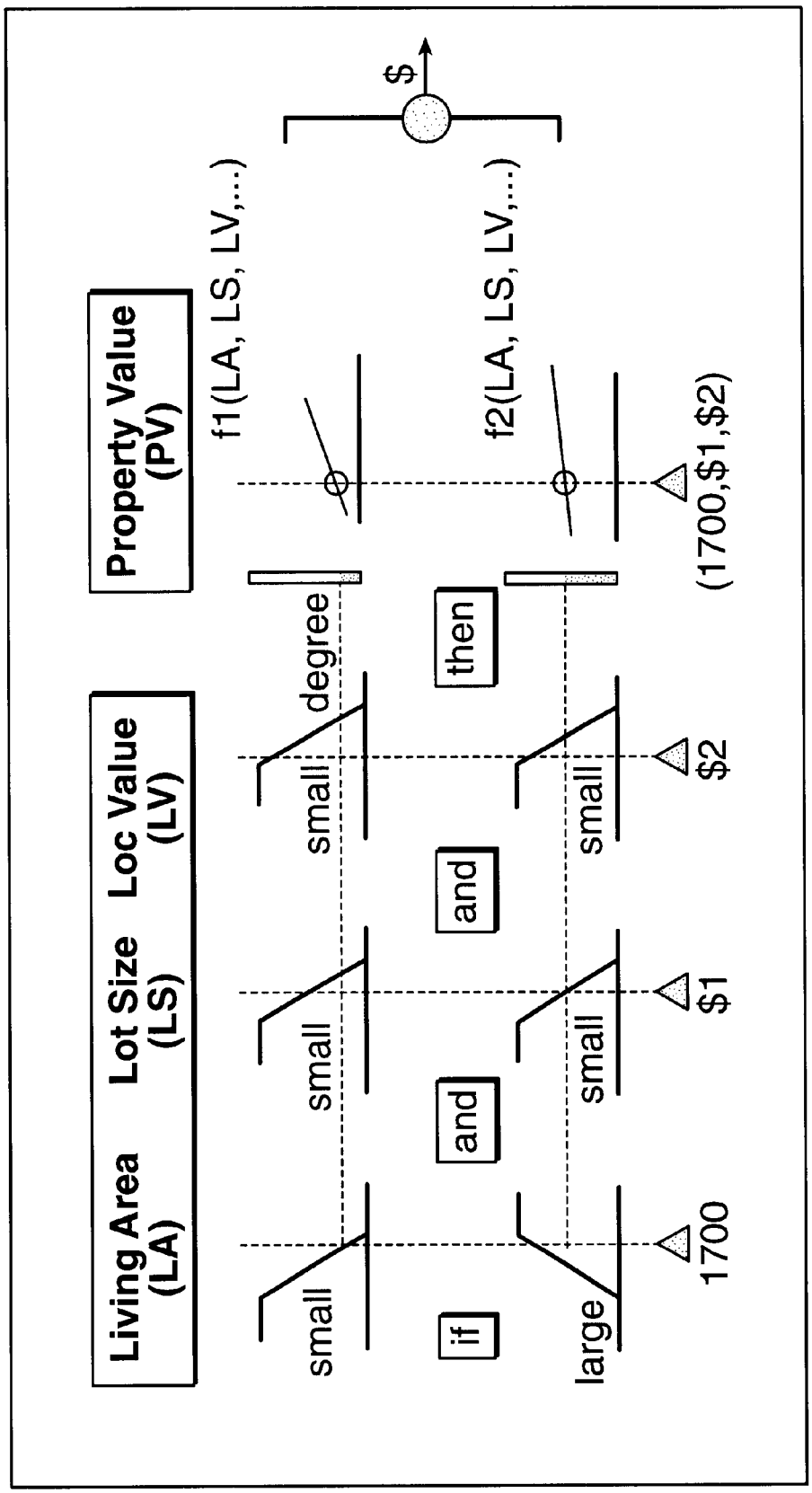
FIG. 4 shows a schematic of the fuzzy interference process for the AIGEN system.

FIG. 4 shows a schematic 48 for the fuzzy inference process, where the rules have the following form:

Rule 1: IF $x$ is $A_1$ and $y$ is $B_1$ THEN $z$ is $f_1(x,y)$ (1)

Rule 2: IF $x$ is $A_2$ and $y$ is $B_2$ THEN $z$ is $f_2(x,y)$ (2)

The two variables x and y take on real values. The predicate $A_i$ against which x is matched is a fuzzy set rather than a crisp value or an interval. All the sets $A_i$ and $B_i$ above are fuzzy sets. The IF part is referred to as the antecedent or precondition of the rule, and the THEN part is the consequent or postcondition.

The IF/THEN rules are used to map inputs to outputs by a fuzzy logic inference system that works in several steps. First, the inputs are matched against the fuzzy sets $A_i$ and $B_i$. Second, the degree of applicability $w_i$ of each rule is determined by multiplying together the degrees to which that rule's antecedent clauses match the given input. Third, the outputs recommended by each rule are determined by evaluating $f_i(x,y)$ on the input. Finally, the output is defuzzified by combining the outputs of all rules by a normalized, weighted sum, where the weight of a rule is its degree of applicability $w_i$.

The specific form used for f(x,y) is a linear function of the inputs, such that the general rule is:

Rule i: IF $x$ is $A_i$ and $y$ is $B_i$ THEN $z$ is $c_{i0}+c_{i1}x+c_{i2}y$ (3)

Such a rule is referred to as a TSK-type rule. A special case of equation (3) is when all $c_{ij}$ except $c_{i0}$ are 0, in which case each rule recommends a fixed number. The inference procedure with TSK-type rules yields:

$$Z=\Sigma_i w_i(c_{i0}+c_{i1}x+c_{i2}y)/\Sigma_i w_i \quad (4)$$

where $w_i$ is the weight of Rule i, computed as a weighted sum.

The antecedent fuzzy membership functions are given by:

$$\mu_A(x)=1/(1+((x-c)/a)^{2b}) \quad (5)$$

The membership function given by equation (5) is centered symmetrically around c, has a width controlled by a, and has a curvature controlled by b. For b=∞, a crisp interval [c−a, c+a] is obtained. For b→∞, the set A tends to a non-fuzzy interval [c−a, c+a]. For b=0, the membership function (i.e., curve) does not bend at all. Although an initial value of b=2 is preferably used, the selection of the initial value of b is not critical as the system will change the value of b if required by the data. Consequently, the tuning of the value of b is not critical.

The weight $w_i$ of each rule is obtained by multiplying the $\mu(x)$ of the two clauses in that rule's IF part. The choice of granularity (i.e., how many fuzzy functions per axis) is governed by the tradeoff between simplicity and accuracy. A high number of rules leads to a more "folded" surface and is preferably avoided unless it is necessary for fitting the data. Preferably, up to two membership functions per input dimension are used.

The system's architecture is based on the number of membership functions assigned to each input dimension. For example, if six inputs are used, and two membership functions are assigned to four of the inputs, the network will have six input units, eight units in the first layer (which come from the two membership functions for each of the four variables), sixteen in the next two layers (which come from every combination of one membership function from each of the four inputs, i.e., 2×2×2×2=16 rules), and one summation unit to produce the output in the output layer. Each of the sixteen rules has a TSK-type consequent which depends on all six inputs. Since each antecedent membership function has three degrees of freedom (a, b, and c), and each consequent has seven coefficients, there are one hundred thirty-six degrees of freedom (8×3+16×7=136).

Once the architecture is constructed, the parameters are initialized in a reasonable manner instead of randomly as in neural networks. For example, the membership functions can be spaced at uniform distances over the axis so as to cover the range of the data points. The consequent linear functions are initialized to zero.

A variant of the gradient descent technique is used to train the network 34 based on training data in order to minimize the mean squared error between the network's 34 outputs and the desired answers, when presented with the data points in the training set. The training of the network 34 includes several steps. First, a sample point in a training data set is presented to the network 34 and the output is computed. Second, the error between the network's 34 output and the desired answer is computed. Third, holding the IF-part parameters fixed, the optimal values of the THEN-part parameters are solved using a least-mean-squares optimization method. A recursive Kalman filter method is preferably used. Fourth, the effect of the IF-part parameters on the error is computed using derivatives of the functions implemented by intermediate layers. Fifth, using the information obtained, the IF-part parameters are changed by small amounts so that the error at the output is reduced. Finally, the above steps are repeated several times using the entire training set, until the error is sufficiently small. Repeating the above steps (i.e., training) is stopped when the error becomes fixed or decreases very slowly. The resulting network 34 is interpreted as a fuzzy rulebase, with each parameter in the network 34 having a definite meaning in terms of the fuzzy sets or consequent functions. Notably, learning speed is very fast compared to the conventional neural net paradigm. Additional data, if available, can be used to further train the network 34 using the same backpropagation-type algorithm. The resulting surface is very well-behaved and provably smooth. The rule base is extremely compact, so a large number of models of the network 34 can be stored easily.

Different models for the same problem can be obtained by changing the inputs to the neuro-fuzzy network, or by varying its architecture. For example, one could make the dollars/sq. ft. value for the property the dependent variable, use a network to compute this value, and then multiply this value by the living area to generate the predicted price. By way of another example, one could make the logarithm of the sale price the dependent variable (i.e., the output of a network), or one could use a different combination of property attributes as the inputs to a network. The choice of which model to deploy depends on the evaluation or error metric. Preferably, models which estimate a property's value, directly, or which estimate a property's value using the sale price per unit of building area, are used.

The AIGEN system 30 uses a network 34 comprising six inputs 42–47 and one output 40. Four of the inputs 42–45 are used to partition the input space into sixteen overlapping sets, and give rise to sixteen fuzzy rules. The remaining two inputs 46, 47 are used only by the consequents of the rules. Each of the sixteen fuzzy rules provide an output (i.e., a prediction based on the six input variables), and the outputs are then combined using interpolative reasoning to produce an estimate of the subject property's value 40. The overall map from six inputs 42–47 to one output 40 is a nonlinear, differentiable map that is constructed by melding together sixteen hyperplanes in a seven dimensional space. For example, the form of a rule can be: IF lot_size is small and living_area is small and locational_value is high . . . THEN price is f( ), where f( ) is a linear function of the six input variables.

The data set of property values used to train the AIGEN system 30 is preferably restricted to a certain price range to eliminate obvious outliers. Consequently, the system 30 is preferably not used to estimate the value of a property that is outside the restricted price range. The system 30 will output a price estimate if given a property that is outside the price range, however, the output will be bound by the range and a warning will be issued to the user of the system. Preferably, one system is used for the entire price range, as opposed to separate systems for each price range.

The sixteen fuzzy rules have one hundred twelve degrees of freedom in the consequent. This is a large share of the dimensionality of the parameter space, which uses a variant of the Kalman filtering algorithm to train the parameters in the consequent. Preferably the consequent is partially (four inputs=eighty parameters) trained using the interleaved backpropagation process described above, followed by a final batch phase where all one hundred twelve consequent parameters are retrained while holding the antecedent parameters constant. The training set is preferably error-free and more or less randomly distributed so as not to bias the system 30. The specific size of the training set is not significant. Preferably, the training data set includes at least ten times the number of degrees of freedom (e.g., 10×136= 1,360). Preferably, only a small part of the total data is used to avoid overfitting of the data.

Inputs to the system 30 are based on seven attributes of a property: total_rooms 45, num_bedrooms, num_baths, living_area 42, lot_size 43, locational_value 44, and deviation_from_prevailing 46. The number of bedrooms and bathrooms are combined to produce a bedrooms/bathrooms ratio 47 that is fed along with the other five values to the system 30. Of the six inputs, total_rooms 45, living_area 42, lot_size 43, and locational_value 44 are used to partition the space into sixteen fuzzy regions. The output 40 is the dollar value of the house. Alternatively, the system 30 can produce the $\log_{10}$(sale_price) as an output. In this embodiment, the inputs are: $\log_{10}$(total_rooms), $\log_{10}$(lot_size), $\log_{10}$(living_area), $\log_{10}$(locational_value), bedrooms/bathrooms, and deviation_from_prevailing. The first four inputs are used to partition the input space. Alternatively, the system 30 can produce the sale_price per square foot of living area as an output. In this embodiment, the inputs are: total_rooms, locational_value/living_area, living_area, lot_size, bedrooms/bathrooms, and deviation_from_prevailing. The output (i.e., the estimated dollar value) is computed by multiplying the output of the system 30 by the living area of the subject property.

Validation is done by testing the system 30 on the entire data set (filtered to remove atypical properties) available from a data source. The filters used for testing are the same as the ones used for screening the training set. As discussed above, the training metric was the mean squared dollar difference between the actual and estimated price. The median of relative error can be used as the principal test metric. For the purposes of evaluation, the error E, for a given test property, is the difference in the predicted sale price and the actual sale price, normalized by the actual price (all in $):

$$E = (\text{actual\_price} - \text{estimate}) / \text{actual\_price} \quad (6)$$

The error E is the absolute-value relative error in sale price per property. Various statistics related to E (e.g., its mean (with or without the absolute value), median, percentiles, standard deviation, probability mass function, cumulative distribution function, etc.) can be analyzed to evaluate E. Preferably, the median (because it is robust to outliers), and the probability distributions (since they encapsulate the entire set of errors in one diagram) are analyzed.

A bad estimate of a property's value is most likely due to two reasons. The first is that the sale price itself is fraudulent or due to a non-arms-length transaction. For example, a large property, having a high TotalValue and TaxAmount that sold for a small purchase price. For such properties, the system 30 will rightly predict a high sale price, but since the actual price happened to be low, a very large relative error will result. Preferably, such sales are filtered from the dataset. More preferably, filters based on TaxAmount, TotalValue and locational_value 44 are used to filter out obviously bad sales during the training set selection process. The second is a genuine mistake that is caused by having an incorrect locational_value 44 prediction. The locational value estimator 10 is well correlated to the actual price. Consequently, the AIGEN system 30 uses the outputs 18, 20 from this estimator 10 as an input and gives it a significant weight. When locational_value 18 is predicted wrongly, the error propagates through to the system's 30 output. A related error is caused by unusual properties where the physical characteristics are too extreme to conform to the typical cases on which the system has been trained.

Preferably, an automated module is used to detect outliers and high errors. In this regard, the system 30 supplements its estimate by indicating the appropriateness of the system 30 for a particular data point. The reliability measure is based on the reliability of the locational_value 18 and overall "averageness" of the subject property's physical attributes. These concepts are converted to a numerical measure using fuzzy sets. The resulting reliability measure varies continuously from zero (minimum) to one (maximum). The value of the reliability measure depends on the following factors, of which the first three are relevant because they influence locational_value 18 (which is one of the inputs to the system 30). The first factor is the number of sales that were used by the modeling step to construct the locational_value 18 at the location of the subject property. The first factor is represented by the variable NumIn1mile, which is the approximate number of properties with sales records within a mile of the subject in the time period used. A value of fifty or more is preferred (reliability=1). If the value is less than twenty-five, the reliability value is zero. Intermediate values lead to a reliability value between zero and one. A fuzzy set (S-shaped) can be defined on the variable NumIn1mile. The second factor is the local variation in the locational_value's $18/sq. ft. surface. If the surface is flat where the subject is, then there is little variation in the immediate neighborhood, and the reliability value should be high. This variation is specified by LocalVar, and is the standard deviation of dollar/sq. ft. values at the four corners of the grid cell in which the subject property is located. Preferably, a variation of less than four dollars/sq. ft. yields a reliability value equal to one, and a variation exceeding thirteen dollars/sq. ft. yields reliability value equal to zero, and intermediate values lead to a reliability value between zero and one. The third factor is the living_area 42 of the subject property. If the subject property is extremely small or extremely large, then there is less reliability in the estimate. A value between 1000 and 3800 sq. ft. is preferred (reliability =1). If the living area is less than 900 sq. ft. or more than 4200 sq. ft., the reliability value is equal to zero. Intermediate values lead to a reliability value between zero and one. The fourth factor is the atypicality of the subject property. Sales in the subject property's five-digit ZIP have a mean and standard deviation associated with the subject property's physical features. The subject property is assigned a score based on how "far away" it is from these mean values. An average house gets a score of zero, whereas a high score is associated with an unusual property. An atypicality score of zero to one is preferred (reliability=1), and if the score exceeds 1.5, the reliability value is zero. Intermediate values yield a reliability value between zero and one. The fifth factor is the lot_size 43. A lot size of at most 0.8 acres is preferred (reliability=1). If the lot size is greater than or equal to 1 acre, the reliability value is zero. Intermediate values yield a reliability value between zero and one. The sixth factor is the total number of rooms. Preferably total_rooms 45 are six to twelve rooms (reliability=1). Less than five or more than twelve total rooms yields a zero reliability value. Intermediate values yield a reliability value between zero and one. The reliability value is the conjunction of the six factors taken as the minimum of the individual reliabilities. This follows from the fuzzy conjunction (minimum) operator which ANDs all the above factors together. Notably, all of the specific thresholds can be easily changed.

Further improvement in E will largely be metric-driven, and is unlikely to be drastic since the market is both imperfect and inefficient, meaning that the ideally maximal information model will also have a residual. Alternatively, other artificial intelligence-based generative approaches can be used to solve problems where an input/output relationship has to be identified from data. For example, fuzzy systems and neural networks can be used in isolation. Each is capable of implementing a multi-input, single-output numeric map. By way of further example, non-artificial intelligence approaches such as statistical linear regression can also be used. In any event, the system approach provides a transparent explanation of the model in terms of a small number of rules that are comprehensible to a human. In addition, it implements a nonlinear regression model.

The system 30 has at most 100–150 degrees of freedom. Consequently, not more than 1500–2000 well-chosen training examples are required to train the system 30. Thus, the size requirements on training data are modest. The computational cost can be easily handled by a typical workstation, even if for example, each county is updated with new data every three months. The decision to update is driven principally by the volatility of the economy, the needs of the business application, and the ease of maintenance required. Notably, testing the system 30 on a subject property is computationally very fast and very simple. No database access is required. Only one property needs to be geocoded and its locational_value 18 estimated. This function is performed by the locational value method 10, after which the system 30 is equivalent to computing a single formula.

AICOMP

Figure 5:
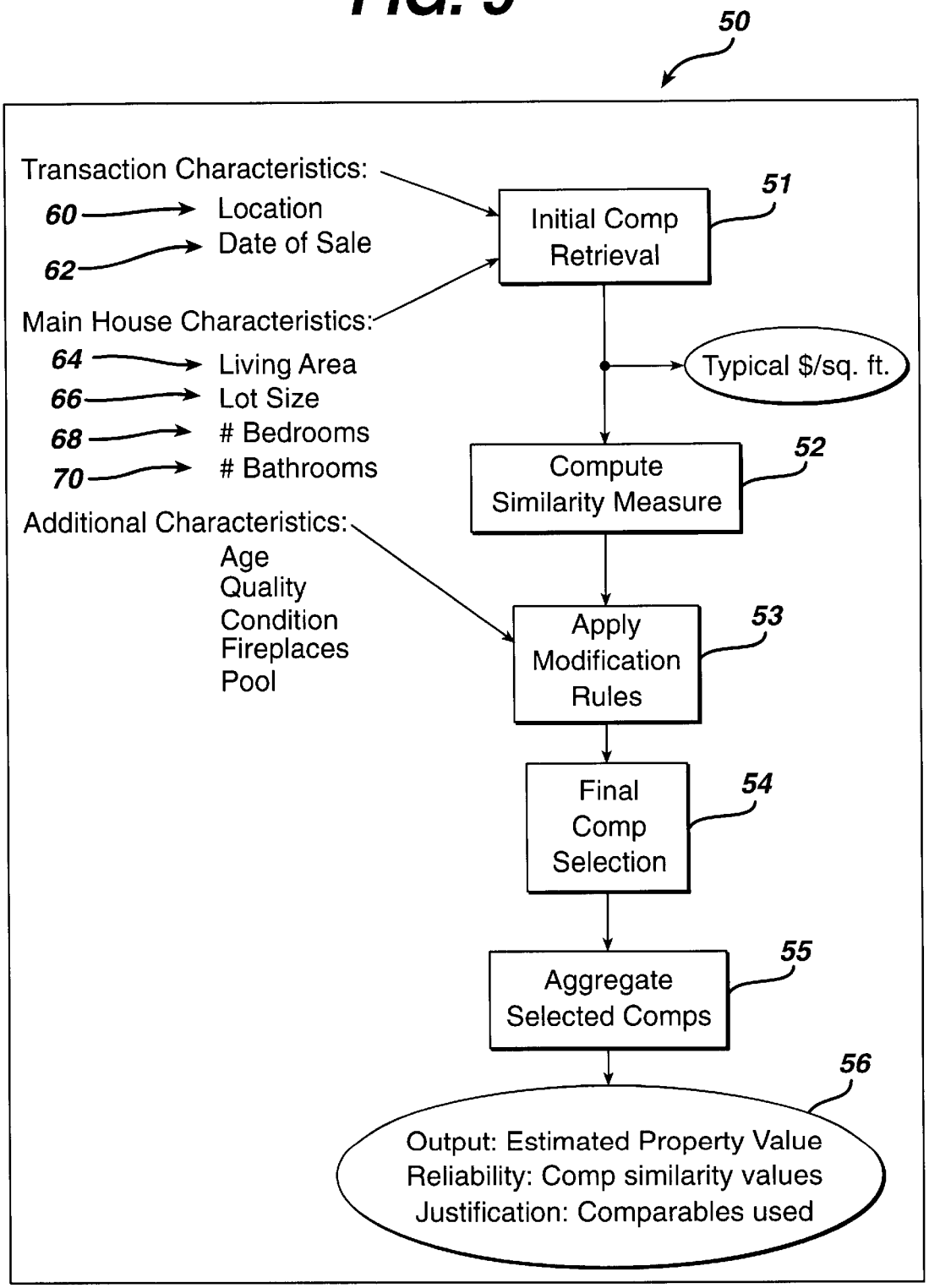
FIG. 5 shows a flow chart for the AICOMP system.

The AICOMP system 50 is a fuzzy case based reasoning system that uses fuzzy predicates and fuzzy-logic based similarity measures to estimate a subject property's value. The system 50 comprises selecting relevant cases, adapting the cases, and aggregating the adapted cases into a single estimate of a property's value. The system 50 captures the intrinsic imprecision of the basic steps in the sale comparison approach—finding the most similar houses, located close to the subject property, sold not too long ago; and selecting a balanced subset of the most promising comparables to derive the final estimate. Referring to FIG. 5, the system 50 first comprises retrieving recent sales from a case-base using a small number of attributes to select potential comparables at 51. Second, the subject property is compared with the retrieved cases and a partial ordering (similarity measure) is derived from the aggregation of fuzzy preference values at 52. Third, the sales price of the retrieved cases is adjusted to reflect the differences from the subject property using a rule set at 53. Finally, the adjusted sales prices of the retrieved cases is aggregated, the best comparables are selected, and a single value estimate is derived for the subject property, along with an estimate of a reliability value at 54, 55 and 56.

Upon entering the subject property's attributes, the system 50 retrieves potentially similar comparables from a case-base using six attributes: address 60, date of sale 62, living area 64, lot area 66, number of bathrooms 68, and bedrooms 70. The comparables are rated and ranked on a similarity scale to identify the comparables most similar to the subject property using a weighted aggregation of the decision making preferences (i.e., the attribute values are weighted according to preference), expressed as fuzzy membership distributions and relations. Each property's sales price is adjusted to better reflect the subject property's value by using a rule set that uses additional property attributes, such as for example, construction quality, conditions, pools, fireplaces, etc. The best four to eight comparables are then selected based on the weighted aggregation of the decision making preferences. Finally, the adjusted sales price and similarity of the selected properties are combined to produce an estimate of the value of the subject property, a reliability value in that estimate, and a justification for the estimate. For example, a property valuation process can consist of retrieving comparables from a database and evaluating each comparable's attributes on a preference scale from zero to one. A weighted sum of preference values, representing each comparable's similarity with the subject, can be calculated, and the comparable's sales price can be adjusted to reflect differences thereof from the subject property. After removing poor quality comparables, the best comparables can be aggregated to provide the estimate.

The initial retrieval step 51 extracts a set of potential comparables using standard SQL queries for efficiency purpose. The selection of comparables is performed by comparing specific attributes of the subject property with the corresponding attribute of each comparable. All the comparables in the retrieved set have values within the allowable deviations. If the size of the retrieved set is too small (e.g., less than 10), the allowable deviations can be relaxed. For example, the initial retrieval can use the following attributes and their corresponding maximum allowable deviations (written after each attribute): Date of sale (within 12 months), Distance (within 1 mile), living area (+/−25%), lot size (+100%/−50%), Number of bedrooms (+/−3), Number of bathrooms (+/−3). These ranges correspond to the fuzzy sets 80 shown in FIG. 6 and the fuzzy relations 82, 84 shown in FIGS. 7 and 8. The first two attributes (number of months since the date of sale 86, and distance from subject 88) are market and region dependent, and each attributes range of allowed values are manually modified or automatically indexed to reflect low or fast markets, as well as urban, suburban, and rural regions. The remaining four attributes (living area 90, lot area 92, number of bedrooms(see FIG. 7), number of bathrooms (see FIG. 8)) reflect some of the subject property's main characteristics.

Figure 6:
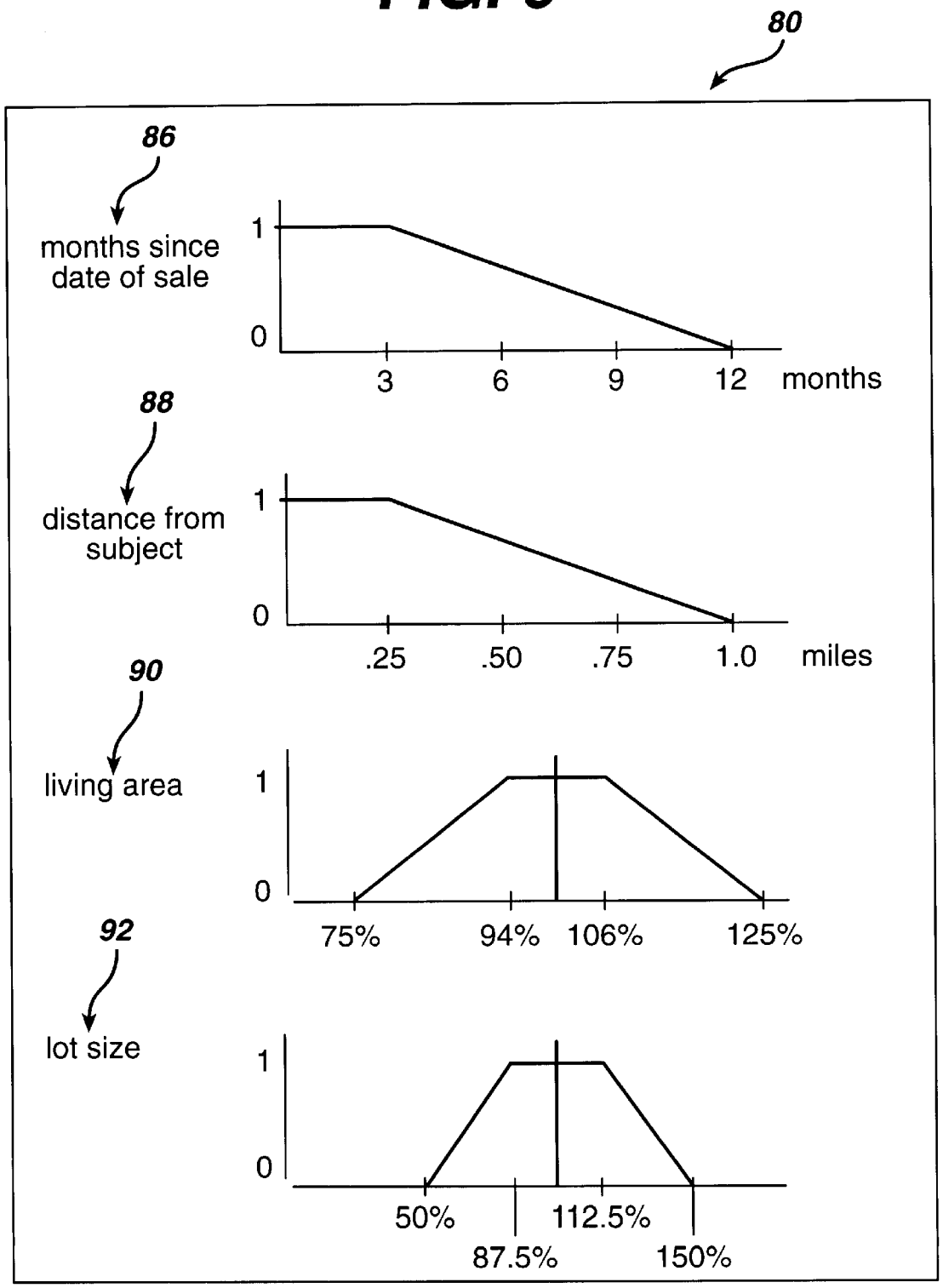
FIG. 6 shows the preference criteria for four attributes.

FIG. 6 describes the preference criteria for the first four attributes (number of months since the date of sale 86, distance from subject property 88, living area 90, and lot size 92). The trapezoidal membership distributions representing these attributes have a natural preference interpretation. For each attribute, the support of the distribution represents the range of tolerable values and corresponds to the interval-value used in the initial retrieval query. The core represents the most desirable range of values and establishes the top preference. By definition, an attribute value falling inside the core will receive a preference value of one. As the attribute value moves away from the most desirable range, its associated preference value will decrease from one to zero. At the end of this evaluation, each comparable has a preference vector, with each attribute having a preference value in the interval zero to one. These values represent the partial degree of membership of each attribute in the fuzzy sets and fuzzy relations for the preferred criteria. For example, by using the preference distributions shown in FIG. 6, the preference value for the attribute date-of-sale of a comparable that was sold within three months of today's date is one. If the date was six months ago, its preference value would be ⅔. Any comparable with a date of sale of more than twelve months would be given a preference value of zero. The remaining two features (number of bedrooms and number of bathrooms) are evaluated in a similar fashion. Their preference functions are represented by two reflexive asymmetric fuzzy relations, illustrated in FIGS. 7 and 8, respectively. For example, for a subject property with five bedrooms, the preferred comparable would also have five bedrooms (preference value=1), while a six bedroom comparable would meet that preference criterion to a degree of 0.8. Similarly, for a subject property with two bathrooms, the preferred comparable would also have two bathrooms (preference value=1), while a 2.5 bathroom comparable would meet that preference criterion to a degree of 0.7.

The next step 44 comprises computing a similarity measure between each potential comparable and the subject property. The similarity measure is a function of the preference vector and of the decision maker's priorities. These priorities are reflected by the weights used before the aggregation. For example, in column 150 entitled a "Weight" of FIG. 9, a set of priorities is illustrated. The sum of all of the weights is one. FIG. 9 also shows an example of the similarity measure computation between the subject and a comparable. Attributes (living area, lot size, number of bedrooms, number of bathrooms) and derived values ,date, distance from the subject property) used for the calculation are listed in the column 100 labeled "Attribute." The values of those attributes for the subject property and comparable are listed in the columns 110 and 120 labeled "Subject" and "Comparable." The evaluation representing the attributes' degree of matching, obtained by using FIGS. 6, 7, and 8, are listed in the "Preference" column 140. The weights reflecting an attribute's relative importance in the specific market area are listed in the "Weight" column 150. The product of the score and weights for an attribute is given in the "Weighted Preference" column 160. Finally, the sum of the weighted preferences represents the similarity measure 170.

Next, all of the comparable properties found by the initial retrieval undergo a series of adjustment to their sales prices to better reflect the subject property's value at 53. Any difference between the subject property and comparable property that causes a comparable to be more or less valuable than the subject property produces an adjustment. If the comparable is superior to the subject property, the comparable's price is decreased. If the comparable is inferior to the subject property, the comparable's price is increased. After all of the comparables have been adjusted, the resulting value is called the comparable adjusted price. For example, FIG. 10 illustrates sample adjustment rules 200, which are triggered by differences between the subject property's and comparable's attributes. FIG. 11 shows possible adjustments 210 (in thousands of dollars) to a comparable's price, as a function of the different number of bathrooms between the subject and the comparable property. The cell identified by the last column 212 and row 214 indicates the adjustment for each additional bathroom when either the subject property or the comparable have more than five bathrooms. FIG. 12 shows a sample computation 220 of a comparable's adjusted price. The Living Area 222 has been adjusted by $(22+(175000\times0.00003))=\$27.25$ per square foot which is $200\times\$27.25=\$5450$. The Lot Area (i.e., lot size) 224 has been adjusted by $1/sq ft for a total of $5000, since the comparable has a larger lot size than the subject property. The Bathrooms 226 are adjusted using the information in FIG. 11 (adjustment figures in 1,000 of dollars). FIG. 12 shows no adjustment for Bedrooms 228 because the comparable has the same number of bedrooms as the subject property. The subject property has one more Fireplace 230 than the comparable causing an adjustment of $2000. The Effective Year Built 232 formula produces an adjustment of $2800. The subject property's Quality 234 is one step better than the comparable so an adjustment of 2% is made to the sale price of the comparable. The subject property has a Pool 236 and the comparable does not thus requiring an adjustment of $10,000 to the sales price of the comparable.

If it is not possible to find four comparables similar to the subject property then no value estimate should be calculated for the subject. Typically, an initial retrieval should yield more than four comparables. Therefore, finding the best four to eight comparables will usually require removing the less desirable comparables. Preferably, the selected comparables have the following properties: (i) no single adjustment should be larger (in absolute value) than 10% of the sales price; (ii) net adjustment should not exceed 15% of the sales price; (iii) gross adjustment should not exceed 25% of the sales price; (iv) the unit price for living area of the comparables should not vary more than 15% from each other and should bracket that of the subject; (v) comparables should be as close as possible to the subject property; (vi) the value estimated for the subject property should be bracketed by the sales price of the comparables.

Figure 13:
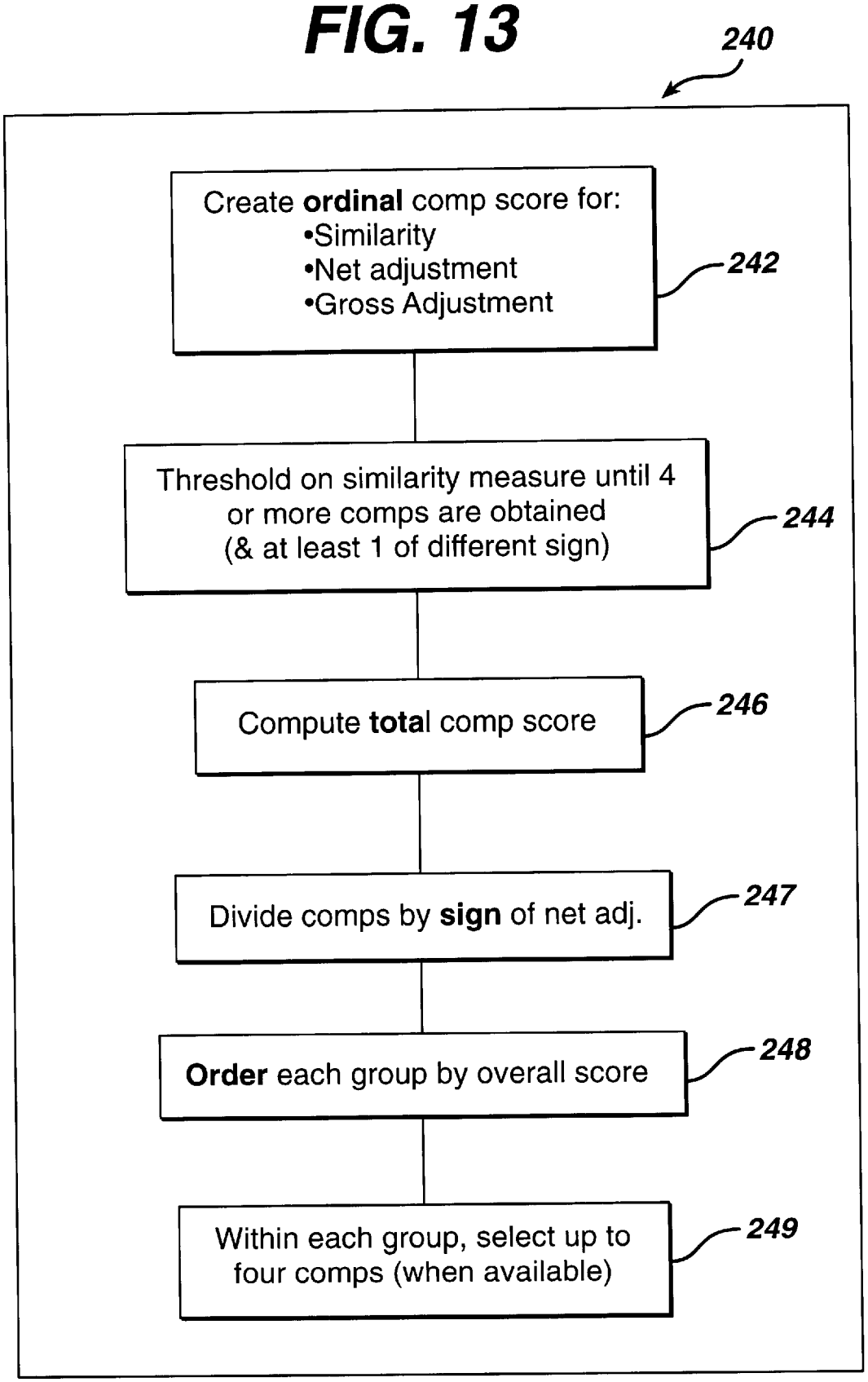
FIG. 13 is a flow chart of the method for selecting the best comparables.

Next, the best comparables are selected at 54 from the remaining comparables by the method 240 shown in FIG. 13. The method 240 includes the steps 242–249. First, the comparables with the highest similarity score, lowest net adjustments, and lowest gross adjustments are determined. These three values are combined into a single ranking of the comparables and each comparable has its similarity score ranked with the other comparables such that the comparable with the best similarity score receives the lowest rank. Net adjustment and gross adjustment are similarly ranked. The sum of the three ranks is computed for each comparable to determine its Total Rank. The comparables with the lowest Total Rank are considered the best.

This method induces a cardinal ordering on the set of comparables. The sales prices of the comparables should bound the estimated sales price of the subject property. Therefore, comparables with both negative and positive net adjustments are preferably selected. Typically, a comparable with a negative net adjustment is likely to have an unadjusted price greater than the final estimate, and vice versa for a comparable with a positive net adjustment. To achieve this bracketing effect, a temporary set of candidates should be created by repeatedly adding the comparable with the best similarity score to the set until: (i) there are at least four comparables in the set and (ii) at least one comparable has a net adjustment sign different from the others. For example, in FIG. 14, the comparables 250 with the top six similarity scores are included in the set. All other comparables are discarded. Of the comparables in the set, only four of each net adjustment sign are retained. The selected ones are the four with the lowest total rank. In the example shown in FIG. 15, comparable number 305–006 is discarded since there are four comparables with a positive net adjustment and lower total rank. The five comparables selected form the final set of comparables.

After the best 4–8 comparables are found, their prices must next be combined to produce the final estimate. Each comparable's contribution to this result is weighted by its similarity score. FIG. 15, for example, shows the calculation 260 of a final estimate from adjusted values of the selected comparables and their similarity scores.

In addition to producing the final estimate of the value of the subject property, a reliability in the estimate is provided by attaching a reliability measure to each estimate. Ideally, the subject properties with the highest reliability will exhibit the lowest errors, and high reliability values are assigned to as many subject properties as possible. The reliability value is calculated from the following five quantitative characteristics: number of cases found in the initial retrieval 262, average of the similarity values for the best four cases 264, typicality 266 of problem with respect to the case-base (i.e., if the attributes of the subject fall within typical ranges for the subjects five digit zip code region), span of, adjusted sales prices of highest reliability solutions 268 (i.e. the highest adjusted sales price minus the lowest adjusted sales price among the selected comparables), distribution of adjusted sales prices of highest reliability solutions 270 (i.e. average percentage deviation of the adjusted sales price of the comparables from the estimated value of the subject property). For example, these characteristics can be evaluated using the fuzzy membership functions 260 illustrated in FIG. 16. These functions map the numerical value of each parameter into a standard numerical reliability, which ranges from zero to one. These standardized reliability values are then aggregated into a final reliability value. Given the conjunctive nature of this aggregation, the minimum of the standardized reliability values is preferably used.

Figure 16:
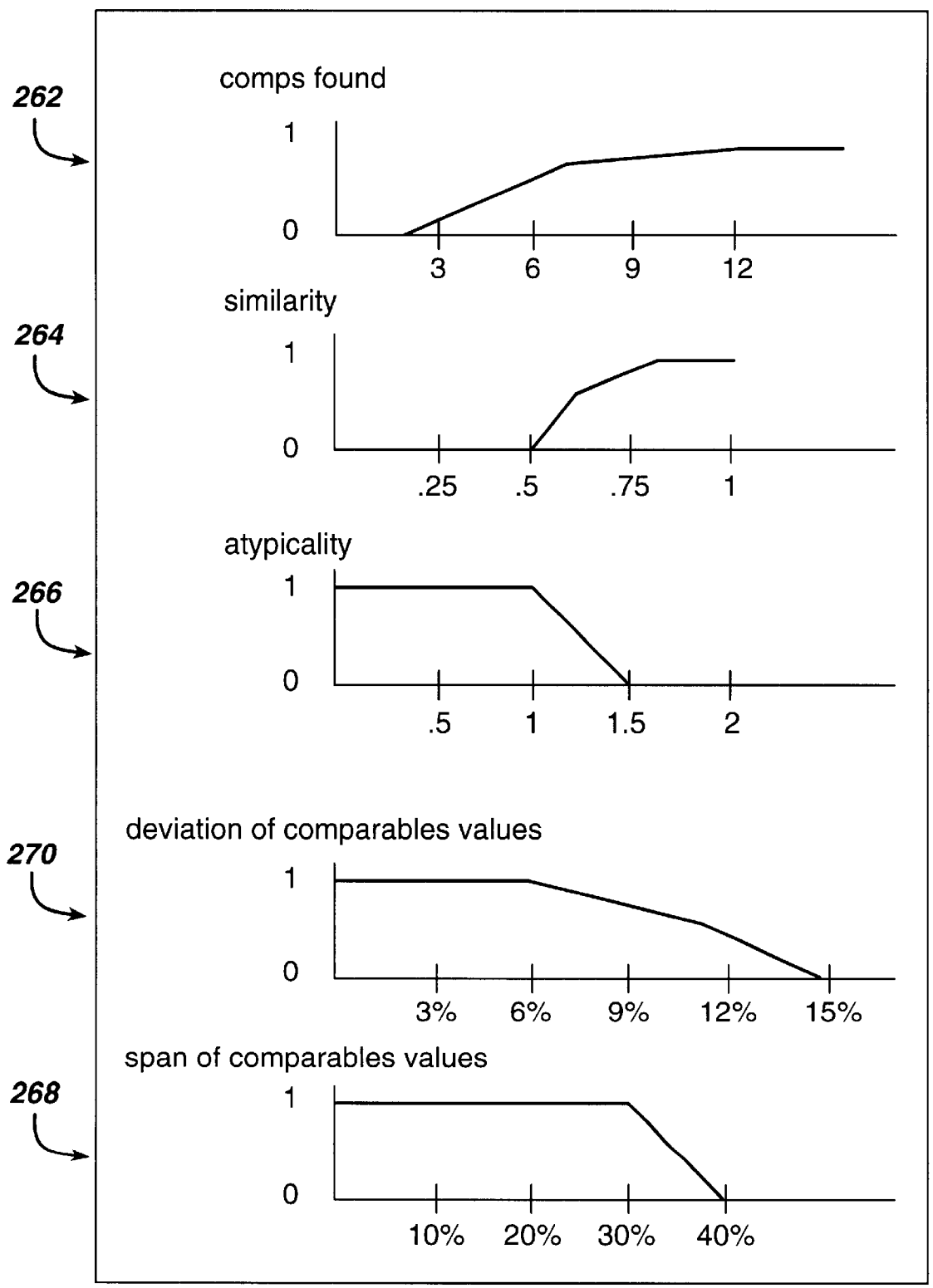
FIG. 16 shows the membership functions for a variety of characteristics.

Referring to FIG. 16, if two or less comparables are found, then the standardized reliability value for comparables found is zero. If between two and seven comparables are found, the reliability value is $((n-2)\times 0.15)$, i.e., the reliability value increases 0.15 for each comparable over two to reach 0.75 when there are seven comparables. Between seven and twelve comparables, the reliability value is $((n-7)\times 0.05)+0.75)$, i.e., the reliability value increases 0.05 for each comparable over seven and reaches 1.0 with twelve comparables. Since the aggregation method is a minimum operator, a low reliability value in any of the characteristics will cause a low reliability value in the result regardless of other excellent reliability values for the other characteristics. As to similarity, there is no reliability value in an estimate whose similarity is lower than 0.5. Otherwise the reliability value rises to one at a similarity of 0.8, and is one for anything over 0.8. Atypicality is computed as a normalized deviation in the region's average lot size, living area, number of bedroom, bathrooms, etc. There is no reliability value in subjects with atypicality greater than 1.5. Reliability values rise linearly as the atypicality decreases from 1.5 to 1.0 and is one when atypicality is less than 1.0. As to deviations in the values of the comparables, there is zero reliability in an estimate if the average comparable deviates from the estimated price by more than 15%. Finally, as to the span of the adjusted values of the comparables, if the span is greater than 40% of the value of the subject property then it is too scattered and there is no reliability in the estimate. To create the membership functions for the five characteristics illustrated in FIG. 16, the system can be run using available information.

The conditional distributions of the estimate error, given each of the reliability characteristics, are next analyzed to predict the error. For example, FIG. 17 shows that the estimate error (in percentage) decreases as the number of comparables found in the initial retrieval increases. Therefore, this number can be used as a filter to predict the expected error. The rules can be transformed into the membership functions as illustrated in FIG. 16. The estimate's reliability value is the conjunctive evaluation of all the rules. The reliability value generated by the rules can be subdivided into three groupings: good, fair, and poor. The reliability measure preferably produces the largest good set with the lowest error.

Finally, the system can also be used in a validation mode to support a sales price, or to determine the reliability value in a sales price. The sales price can be given or supplied by another estimator. In this mode, the system finds comparables to validate the given price. Using the actual sales price as a target, comparables can be found that support a sales price with a median absolute difference from the actual sales price of, for example, 0.5%.

FUSION

The fusion system 300 comprises a method to combine the dollar estimates produced by each of the three models that have been described above. It also combines the reliabilities of each of the dollar values to produce a combined quality level for the final dollar estimate. This procedure has the following steps. First, a method for assessing the reliability or "goodness" of each individual estimate is described. Second, an algorithm for combining the three values produced by LOCVAL, AIGEN, and AICOMP into a fused value is described. Third, a rule-base is developed which determines the overall quality of the fused estimate, which is referred to as the fusion of the reliabilities. Finally, explanatory messages are generated to a user of the fusion system when the overall quality is limited. The messages enable a user to understand why the best possible estimate cannot be produced. Further information by a user may then enable the fusion system to improve the fused estimate. The overall system is referred to as ARPV (Automated Residential Property Valuation). The final output of the system is referred to as the ARPV ESTIMATE. The accompanying measure of reliability is called the QUALITY. The fusion system 300 can be implemented in the form of a computer program and can be executed by any means capable of executing a stored program (i.e., processor means).

Figure 18:
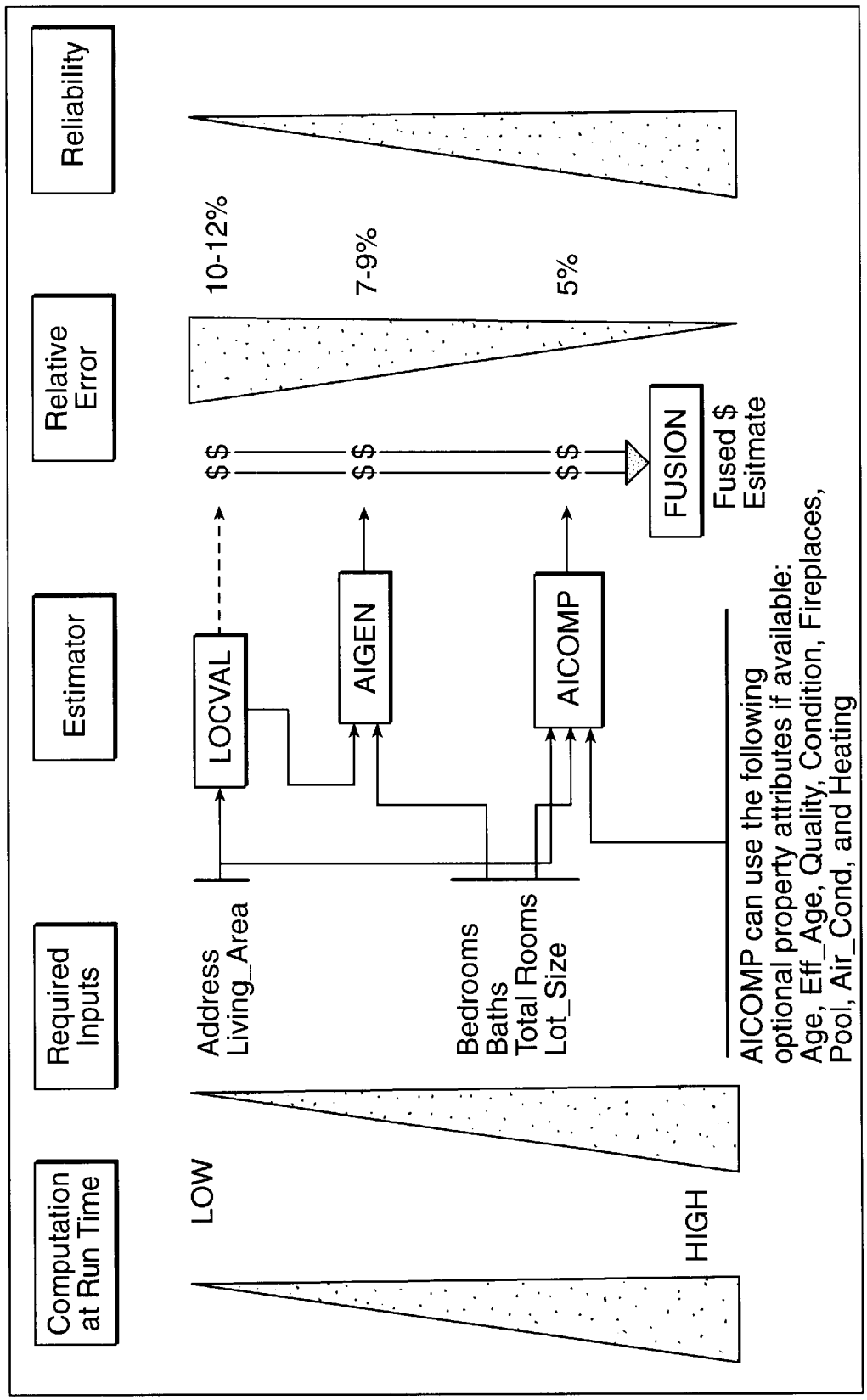
FIG. 18 shows a schematic of the Fusion system.

Referring to FIG. 18, the output of the LOCVAL system 10 is used as an input to AIGEN system, and AICOMP and AIGEN both use property descriptions to produce their outputs. The outputs of the AICOMP and AIGEN systems are next combined to produce the final ARPV ESTIMATE of the subject property's value and an overall measure of reliability or QUALITY. Finally, ARPV provides a description of circumstances for the data, property, and environment that may have led to a limited value of QUALITY.

If both AIGEN and AICOMP estimates are known, then ARPV ESTIMATE is set to the weighted mean of the two estimates, weighted by their respective normalized reliabilities. This is given by $$\text{ARPV ESTIMATE} = (v_{AIG} x r_{AIG} + v_{AIC} x r_{AIC}) / (v_{AIG} + v_{AIC}) \quad (7)$$

where $v_{AIG}$ is the value produced by AIGEN, $v_{AIC}$ is the value produced by AICOMP, $r_{AIG}$ is the reliability of $v_{AIG}$, and $r_{AIC}$ is the reliability of $_{AIC}$.

The combination of the outputs of the AICOMP and AIGEN systems depends on the relative strengths of each output's reliability, and the amount of disagreement between the two estimated values. Each estimate has a reliability value in the range of zero to one. The amount of disagreement is measured by contention between the values produced by the AIGEN system (referred to as $v_{AIG}$), and produced by AICOMP system (referred to as $v_{AIC}$). Contention is defined by:

$$\text{Contention} = (v_{AIG} 31\ v_{AIC}) / ((v_{AIG} + v_{AIC}) / 2)) \quad (8)$$

and is definable only when both estimators $v_{AIG}$ and $v_{AIC}$ have produced a valid answer.

QUALITY is a measure of the reliability of ARPV ESTIMATE and takes one of three values. The first value is EXCELLENT, which means that all essential data is available, the reliability values for the independent estimators are high, and the independent estimators agree. The second value is INDICATIVE, which means all essential data is available, the reliability values of one or more estimators is not high due to somewhat unusual property and/or local market characteristics, and/or the estimators disagree. The third value is UNRELIABLE, which means that some essential data may be missing, and/or the reliability values in one or more estimators is low due to very unusual property and/or local market characteristics, and/or the estimators disagree markedly. QUALITY is obtained by the following rules. If contention is low, and the reliability value of one of the estimators is high, and the reliability values of the other estimators is not low then the Quality of the fused estimate is EXCELLENT. If contention is high, or the reliability values of the estimators are low then Quality is set to UNRELIABLE. In all remaining cases, Quality is set to INDICATIVE. The definitions of the terms low, medium, and high for contention as well as the reliability values have been numerically set so as to create a conservative system. These sets are currently crisp, and not fuzzy. However, both these characteristics can be suitably changed to suit the needs of a specific business application.

If one of the AIGEN or AICOMP estimates is known but the other is not, then no combination is possible. In this case, ARPV ESTIMATE is set to the value of the available estimator and QUALITY is deemed UNRELIABLE. As a further refinement of the methodology, there are certain circumstances within this case where QUALITY could be upgraded to INDICATIVE. If both the AIGEN and AICOMP estimates are unknown, then no combination is possible. In such cases where the property can be geocoded and the living area is known, ARPV ESTIMATE is set equal to the LOCVAL estimate. Otherwise, ARPV ESTIMATE is set to a simple average such as for the 5-digit ZIP or the county. QUALITY is deemed UNRELIABLE. These three cases cover all the possibilities and are encoded as rules. The final outputs are the fused ARPV ESTIMATE and QUALITY.

Finally, if the QUALITY is not EXCELLENT, explanatory messages are produced. The first message explains why one or more of the estimators were not able to produce an estimate. If the lack of an estimate is due to missing or unusual attributes, such attributes are listed. The second message explains why QUALITY may be less than EXCELLENT. The message may have the following three parts, each of which is explained using an example. First, Contention=0.5 indicates amount of disagreement between AIGEN and AICOMP estimates. Second, AIGConf not HI (TotalRooms=5) indicates that AIGEN reliability was not HIGH because the property has a significantly smaller total room count than the typical house. Third, AICConf not HI (CompsFound=8) indicates that AICOMP reliability was not HIGH because the first phase of comparable searches found only 8 comparable houses within a year and a mile. Consequently, a user may then be able to obtain additional information to improve the QUALITY.

It is therefore apparent that there has been provided in accordance with the present invention, method and system that fully satisfy the aims and advantages and objectives set forth herein. The invention has been described with reference to several embodiments, however, it will be appreciated that variations and modifications can be effected by a person of ordinary skill in the art without departing from the scope of the invention.

What is claimed is:

1. A method of utilizing a fused estimate for estimating the value of a subject property and providing a quality measure of the estimated value, said method comprising the steps of:

providing a first system capable of utilizing a first valuation methodology to provide a first estimate of the value of the subject property and a first reliability measure of the first estimate;

providing a second system capable of utilizing a second valuation methodology to provide a second estimate of the value of the subject property and a second reliability measure of the second estimate;

obtaining from said first system a first estimate of the value of the subject property;

obtaining from said first system a first reliability measure of said first estimate;

obtaining from said second system a second estimate of the value of the subjected property;

obtaining from said second system a second reliability measure of said second estimate;

automatically providing the fused estimate of the value of the subject property based on said first estimate and said second estimate; and automatically providing a quality measure of said fused estimate based on said first reliability measure and said second reliability measure, wherein the first valuation methodology and the second valuation methodology comprise different valuation methodologies, and wherein the fused estimate is capable of providing a better estimate of the value of the subject property than an individual estimate of the subject property produced by using a single valuation methodology alone.

2. The method of claim 1, wherein said step of automatically providing a fused estimate of the value of the subject property is based on said first estimate, said second estimate, said first reliability measure and said second reliability measure.

3. The method of claim 1, further comprising the steps of:

providing a third system capable of utilizing a third valuation methodology to provide a third estimate of the value of the subject property and a third reliability measure of the third estimate;

obtaining from said third system a third estimate of the value of the subject property;

obtaining from said third system a third reliability measure of said third estimate;

wherein said step of automatically providing the fused estimate of the value of the subject property further comprises automatically providing the fused estimate of the value of the subject property based on said first estimate, said second estimate and said third estimate; and wherein said step of automatically providing a quality measure of said fused estimate further comprises automatically providing a quality measure of said fused estimate based on said first reliability measure, said second reliability measure and said third reliability measure.

4. The method of claim 1, wherein said first reliability measure and said second reliability measure have a value in the range of zero to one.

5. A method of utilizing a fused estimate for estimating the value of a subject property, said method comprising the steps of:

utilizing a first valuation methodology to provide a first estimate of the subject property based on multiple attributes of the subject property;

providing a first reliability measure for said first estimate;

utilizing a second valuation methodology to provide a second estimate of the subject property based on multiple comparable properties;

providing a second reliability measure for said second estimate;

estimating the value of the subject property using said first estimate, said second estimate, said first reliability measure, and said second reliability measure to produce a fused estimate of the value of the subject property;

determining the quality of the estimated value of the subject property from said first estimate, said second estimate, said first reliability measure, and said second reliability measure, wherein the first valuation methodology and the second valuation methodology comprise different valuation methodologies, and wherein the fused estimate is capable of providing a better estimate of the value of the subject property than an individual estimate of the subject property produced by using a single valuation methodology alone.

6. The method of claim 5, further comprising the step of:

utilizing a third valuation methodology to provide a third estimate of the subject property based on the address and square footage of the subject property;

providing a third reliability measure for said third estimate;

wherein said step of providing a first estimate uses said third estimate as a basis to provide said first estimate; and wherein said step of providing a first reliability measure uses said third reliability measure to provide said first reliability measure.

7. The method of claim 6, wherein said step of utilizing a third valuation methodology to provide a third estimate further comprises:

retrieving the values, the square footage and geographic locations of properties within a preselected geographic region;

constructing a smooth function spanning the preselected geographic region that represents a dollar per square foot value at every point of longitude and latitude in the preselected geographic region;

determining the estimated value of the subject property based on the subject property's address and subject property's square footage.

8. The method of claim 5, wherein said step of utilizing a first valuation methodology to provide a first estimate comprises the steps of:

providing a generative system based.on the combination of fuzzy logic systems and neural networks capable of accepting multiple inputs and providing a single output;

retrieving data for multiple properties, the data for each property including information regarding multiple attributes and selling price of the property;

training said generative system using the retrieved data, using said attribute information as inputs and adjusting said generative system to cause the output of the generative system to conform with the selling price of the property associated with the attribute information;

providing attribute information regarding the subject property to said trained generative system; and receiving the estimated value of the subject property from said trained generative system.

9. The method of claim 5, wherein said step of utilizing a second valuation methodology to provide a second estimate comprises the steps of:

providing attribute information regarding the subject property;

retrieving comparable properties using said attribute information;

comparing attribute information associated with the retrieved comparable properties;

ordering the retrieved comparable properties in accordance with predefined preferences regarding said attribute information;

adjusting the price of the comparable properties to reflect the differences between the comparable property and the subject property;

determining the estimated value of the subject property using the adjusted price of the comparable properties.

10. A system for utilizing a fused estimate for estimating the value of a subject property and providing a quality measure of the estimated value, said system comprising:

a first system capable of utilizing a first valuation methodology to provide a first estimate of the value of the subject property and a first reliability measure of the first estimate;

a second system capable of utilizing a second valuation methodology to provide a second estimate of the value of the subject property and a second reliability measure of the second estimate;

means for processing a first estimate of the value of the subject property received from said first system and a second estimate of the value of the subject property received from said second system and providing the fused estimate of the value of the subject property based on said first estimate and said second estimate; and for processing a first reliability measure from said first system and a second reliability measure from said second system and providing a quality measure of said fused estimate based on said first reliability measure and said second reliability measure, wherein the first valuation methodology and the second valuation methodology comprise different valuation methodologies, and wherein the fused estimate is capable of providing a better estimate of the value of the subject property than an individual estimate of the subject property produced by using a single valuation methodology alone.

11. A system as claimed in claim 10, wherein said first system comprises:

a generative system based on the combination of fuzzy logic systems and neural networks capable of accepting multiple inputs and providing a first estimate of the subject property and a first reliability measure.

12. A system as claimed in claim 10, wherein said first system is capable of:

retrieving data for multiple properties that includes for each property information regarding multiple attributes and the selling price of the property; and using said attribute information for each property as inputs; and adjusting the first system to cause the output of the first system to conform to the value of the property associated with the attribute information.

13. A system as claimed in claim 10, wherein said second system is capable of:

accepting as input attribute information regarding the subject property;

retrieving comparable properties using said attribute information;

comparing the attribute information regarding the subject property with attribute information associated with each retrieved comparable property;

ordering the retrieved comparable properties in accordance with predefined preferences regarding said attribute information;

adjusting the price of each comparable property to reflect the differences between the comparable property and the subject property;

determining the estimated value of the subject property using the adjusted price of the comparable properties.

14. A method for utilizing a fused estimate for estimating the value of a subject property, comprising:

providing a first system capable of utilizing a first valuation methodology to provide a first estimate of the value of the subject property;

providing a second system capable of utilizing a second valuation methodology to provide a second estimate of the value of the subject property;

obtaining from said first system a first estimate of the value of the subject property;

obtaining from said second system a second estimate of the value of the subject property; and automatically providing the fused estimate of the value of the subject property based on said first estimate and said second estimate, wherein the first valuation methodology and the second valuation methodology comprise different valuation methodologies, and wherein the fused estimate is capable of providing a better estimate of the value of the subject property than an individual estimate of the subject property produced by using a single valuation methodology alone.

15. The method of claim 14, further comprising:

providing a third system capable of utilizing a third valuation methodology to provide a third estimate of the value of the subject property;

obtaining from said third system a third estimate of the value of the subject property; and automatically providing the fused estimate of the value of the subject property based on said first estimate, said second estimate and said third estimate.

16. A method for utilizing a fused estimate for estimating the value of a subject property, comprising:

utilizing a first valuation methodology to provide a first estimate of the subject property based on multiple attributes of the subject property;

utilizing a second valuation methodology to provide a second estimate of the subject property based on multiple comparable properties; and estimating the value of the subject property using said first estimate and said second estimate, wherein the first valuation methodology and the second valuation methodology comprise different valuation methodologies, and wherein the fused estimate is capable of providing a better estimate of the value of the subject property than an individual estimate of the subject property produced by using a single valuation methodology alone.

17. The method of claim 16, further comprising:

utilizing a third valuation methodology to provide a third estimate of the subject property based on the address and square footage of the subject property; and using said third estimate as a basis to provide said first estimate.

18. The method of claim 17, wherein utilizing a third valuation methodology to provide a third estimate comprises:

retrieving square footage values and addresses of properties within a preselected geographic region;

constructing a smooth function spanning the preselected geographic region that represents a dollar per square foot value at every point of longitude and latitude in the preselected geographic region; and determining the estimated value of the subject property based on the address and square footage of the subject property.

19. The method of claim 16, wherein utilizing a first valuation methodology to provide a first estimate comprises:

providing a generative system based on the combination of fuzzy logic systems and neural networks capable of accepting multiple inputs and providing a single output;

retrieving data for multiple properties, the data for each property including information regarding multiple attributes and selling price of the property;

training said generative system with said retrieved data;

providing attribute information regarding the subject property to said trained generative system; and receiving the estimated value of the subject property from said trained generative system.

20. The method of claim 19, wherein said training comprises using said attribute information as inputs and adjusting said generative system to cause the output of the generative system to conform with the selling price of the property associated with the attribute information.

21. The method of claim 16, wherein utilizing a second valuation methodology to provide a second estimate comprises:

providing attribute information regarding the subject property;

retrieving comparable properties using said attribute information;

comparing attribute information associated with the retrieved comparable properties;

ordering the retrieved comparable properties in accordance with predefined preferences regarding said attribute information;

adjusting the price of the comparable properties to reflect the differences between the comparable property and the subject property;

determining the estimated value of the subject property using the adjusted price of the comparable properties.

22. A system of utilizing a fused estimate for estimating the value of a subject property, comprising:

a first automated property valuation estimator capable of utilizing a first valuation methodology to provide a first estimate of the value of the subject property;

a second automated property valuation estimator capable of utilizing a second valuation methodology to provide a second estimate of the value of the subject property; and a fusion system that processes the first estimate of the value of the subject property received from said first automated property valuation estimator and a second estimate of the value of the subject property received from said second automated property valuation estimator and provides a fused estimate of the value of the subject property based on said first estimate and said second estimate, wherein the first valuation methodology and the second valuation methodology comprise different valuation methodologies, and wherein the fused estimate is capable of providing a better estimate of the value of the subject property than an individual estimate of the subject property produced by using a single valuation methodology alone.

23. A system of claim 22, wherein said first automated property valuation estimator comprises:

a generative system based on the combination of fuzzy logic systems and neural networks capable of accepting multiple inputs and providing a first estimate of the subject property.

24. A system of claim 22, wherein said first automated property valuation estimator is capable of retrieving data for multiple properties, wherein the data for each property includes a multiple of attribute information and the selling price of the property; using said attribute information for each property as inputs; and outputting a value that conforms to the value of the property associated with the attribute information.

25. A system of claim 22, wherein said second automated property valuation estimator is capable of accepting as input attribute information regarding the subject property; retrieving comparable properties using said attribute information; comparing the attribute information regarding the subject property with attribute information associated with each retrieved comparable property; ordering the retrieved comparable properties in accordance with predefined preferences regarding said attribute information; adjusting the price of each comparable property to reflect the differences between the comparable property and the subject property; and determining the estimated value of the subject property using the adjusted price of the comparable properties.

26. A method for utilizing a fused estimate for estimating the value of a subject property, said method comprising the steps of:

utilizing LOCVAL to provide a first estimate of the value of the subject property;

utilizing AIGEN to provide a second estimate of the value of the subject property;

utilizing AICOMP to provide a third estimate of the value of the subject property; and automatically providing the fused estimate of the value of the subject property based on said first estimate, said second estimate, and said third estimate;

wherein LOCVAL, AIGEN and AICOMP comprise different valuation methodologies, and wherein the fused estimate is capable of providing a better estimate of the value of the subject property than an individual estimate of the subject property produced by using either LOCVAL, AIGEN or AICOMP alone.

* * * * *